3,475,207
FABRICS HAVING IMPROVED TEAR STRENGTH OBTAINED BY TREATMENT WITH HIGH DENSITY OXIDIZED POLYETHYLENE
Julian Berch, Washington, D.C., and Arnold M. Sookne, Silver Spring, Md., assignors, by mesne assignments, to Allied Chemical Corporation, New York, N.Y., a corporation of New York
No Drawing. Continuation-in-part of application Ser. No. 451,623, Apr. 28, 1965. This application Oct. 18, 1965, Ser. No. 497,538
Int. Cl. C08d *13/16;* B44d *1/22*
U.S. Cl. 117—143   4 Claims

ABSTRACT OF THE DISCLOSURE

Fabrics treated with emulsions of oxidized high density polyethylene have durably improved tear strength and luster.

---

This application is a continuation-in-part of our copending application having Ser. No. 451,623, filed Apr. 28, 1965.

This invention relates to an improved process for treating various fabrics produced from natural and synthetic fibers, including resin-treated fabrics, to improve the tear strength thereof. More particularly, this invention relates to a process for improving the tear strength of various fabrics by treating them with minor amounts of high density polyethylene. This invention also relates to the composition of various fabrics in combination with minor amounts of high density polyethylene.

It is known in the art that the tear strength of many fabrics is improved by the application of conventional low density polyethylene. However, the application of low density polyethylene has the drawback that the polyethylene is removed to a considerable extent by laundering or drycleaning. In addition, it is necessary to apply relatively large amounts to obtain a substantial improvement in tear strength.

One object of the instant invention is to produce a process which will result in improving the tear strength of various fabrics including resin treated fabrics which tear strength improvement will be durable to repeated cleaning. Another object of the instant invention is to produce a process wherein the amount of polyethylene added to the fabric to impart increased tear strength of good durability is relatively minor as compared to that required with low density polyethylene. Another object of the instant invention is to produce a fabric impregnated with high density polyethylene whose tear strength improvement is of high durability after repeated laundering or drycleaning. A further object of the instant invention is to improve the luster of various fabrics which luster improvement remains after repeated launderings or drycleanings.

In summary these and other objects are produced in the present invention by impregnating various fabrics including resin treated fabrics with an emulsion of high density polyethylene and thereafter drying the thus treated material. The preferred amount of high density polyethylene add-on is in the range 0.05 to 5%, preferably 0.1 to 2.0% based on the weight of the untreated fabric.

The application of high density polyethylene to the various fabrics results in materials which have improved tear strength and luster even after the treated materials are subjected to numerous launderings or drycleanings.

As used herein the term "high density polyethylene" means ethylene homopolymer and copolymers of ethylene and other α-olefins wherein said homopolymer and said ethylene-containing copolymers have a density in the range 0.935 to 0.970 g./cc. and a crystalline melting point in the range 115 to 137° C. prior to oxidation. Thus, copolymers of ethylene and other α-olefins such as propylene, butene-1, hexene-1, pentene-1, heptene-1, 4-methyl-pentene-1, 3-methyl-butene-1 and the like, which copolymers have densities in the range 0.935 to 0.970 g./cc. and crystalline melting points in the range 115 to 137° C. are operable as starting materials in this invention. For purposes of description, the invention will be explained for the most part using high density linear polyethylene per se as the material unless otherwise stated.

The term "emulsifiable polyethylene" herein means "high density polyethylene" as defined above which has been subjected to oxidation until it has a carboxyl content of 0.2 to 2.0, preferably 0.3 to 1.1 milliequivalents/g.

As used herein, unless otherwise specified, the term "emulsion" means an emulsifiable high density polyethylene dispersion in which water forms the continuous phase.

The term nylon is used in this invention to signify a polycarbonamide having recurring amide units as an integral part of the main polymer chain. Such materials are chemically known as polyamides, the most common of which are 6—6 nylon and 6 nylon. Nylon polymers suitable in the instant invention may be prepared according to processes described in United States Patents Nos. 2,071,250, 2,071,253 and 2,130,948. Other processes are well known to those skilled in the art. Nylon materials formed by the reaction of diamines and dicarboxylic acid as well as those formed by polymerization of amino acids are suitable herein. A valuable class of reactants for the use are diamines of formula $NH_2RNH_2$ and dicarboxylic acids of formula $HOOCR'COOH$ in which R and R' are divalent hydrocarbon radicals free from aliphatic unsaturation and in which each R and R' has a chain length of at least two carbon atoms. Especially useful reactants within this group are those in which R is $(CH_2)_x$ and R' is $(CH_2)_y$ in which $x$ is at least 4 and $y$ is at least 3. Instead of using a single diamine and a single dicarboxylic acid, mixtures of diamines and/or dicarboxylic acids can be employed. In order to obtain a fiber-forming nylon, the diamine and dicarboxylic acid should be used in substantially equimolecular proportions; that is, not more than about 5% excess of either reactant should be employed. A small excess of either reactant may be desirable in order to obtain a nylon of stable viscosity.

"Dacron" is a trade name for Du Pont polyester fiber made from a diol and a member selected from the group consisting of terephthalic acid and a mixture of dibasic acids of which terephthalic acid comprises at least about 90%.

"Acrilan" is a trade name for synthetic fiber made from at least 85% acrylonitrile manufactured by the Chemstrand Corporation.

The high density polyethylene operable in this invention can be produced by many methods well known in the art. For example polyethylene having a density of 0.935–0.970 can be obtained using the Phillips catalyst system, i.e. chromium oxide on a $SiO_2$-$Al_2O_3$ support wherein at least part of the chromium in the hexavalent state. The polymerization is performed at temperatures of 60–260° C. as described in U.S. 2,825,721. Another catalyst system capable of forming the high density polyethylene used herein is disclosed in U.S. 2,816,883. Yet another catalyst system consisting essentially of vanadium oxytrichloride and ethyl aluminum dichloride will yield high density polyethylene having a melt index less than 0.01. Still another catalyst system yielding very high molecular weight polyethylene having a melt index less than 0.01 and a density of about 0.96 comprises $TiCl_3$ and diethyl aluminum chloride. Still another method of producing high density polyethylene is the Ziegler process wherein the catalyst consists essentially of compounds of metals of Group IV–B, V–B, and VI–B of the periodic table and an aluminum trialkyl compound as set out in Belgian Patent 533,362 issued to K. Ziegler. Yet another method of forming high density polyethylene operable herein is disclosed in U.S. 2,949,447. Other methods of producing polyethylene with a density in the range 0.935–0.970 are well known to those skilled in the art. The copolymers operable in the instant invention can be formed by the methods taught in U.S. 2,825,721 and in Belgian Patents 543,259 and 538,782.

The high density polyethylenes operable in the instant invention have a density in the range 0.935–0.970 g./cc. and a melting point in the range 115–137° C. prior to the oxidation step. However, the density of the polymer increases as the extent of oxidation increases. This is the result of the substitution of heavier oxygen atoms (atomic weight 16.0) in the polymer in place of hydrogen (atomic weight 1.008). Consequently the densities of the oxidized emulsifiable products of this invention range between 0.945 and 1.050 g./cc., the exact value in any instance depending on the initial density of the starting polymer, and the extent of oxidation.

The high density polyethylene of the instant invention has a weight-average molecular weight in the range 20,000 to 2,000,000 or more, calculated from fractionation data in accord with the procedure in "Techniques of Polymer Characterization," P. W. Allen, p. 3, Academic Press, Inc., New York, N.Y. (1959).

The oxidized emulsifiable high density polyethylene employed in the practice of the instant invention has a melt index in the range 0.1 to 20,000 or more and contains oxygen-containing functional groups in the following ranges:

TABLE I

| Group: | Range milliequivalents/g. oxidized polyethylene |
|---|---|
| Hydroxyl | 0.04–0.17 |
| Carboxyl | 0.20–2.00 |
| Ester | 0.04–0.50 |
| Total carbonyl | [1] 0.46–2.72 |

[1] 1.3—7.6 wt. percent C.=0.

The above described functional groups are the most important ones present in the oxidized polyethylene in terms of chemical reactivity, emulsifiability, promotion of adhesion to substrates, printability, and the like. However, in addition to these groups, other oxygen-containing species are known or believed to be present in the oxidized polyethylene in somewhat less concentrations. Examples of these other groups would be ethers (R—O—R) and the non-carbonyl portions of esters

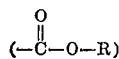

and anhydrides

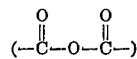

In order to measure quantitatively all of the oxygen present in the oxidized polyethylene, one must therefore resort to a direct elemental analysis of oxygen. In the products of this invention it has been found by such direct analysis that the total chemical combined oxygen content may range from 0.75 to 7.0 weight percent oxygen.

The method by which the polyethylene is oxidized to form the requisite amount of carboxyl in the polymer chains is not critical. Polyethylene can be readily oxidized by various well known methods to give polymers containing carboxyl groups. The techniques for introducing carboxyl groups into polyethylene are exemplified by, but are not limited to, the following methods. For example, polyethylene can be milled in oxygen, oxygen enriched air or air at a temperature ranging from 70° up to the melting point of the polymer. Another method is to suspend particles of polyethylene in water or an organic solvent and either bubble air through the suspension or pressurized the system with air at a temperature ranging from 70° up to the melting point of the polymer. Yet another method is to pass ozone-enriched air or other oxygen-containing gas at a temperature below the melting point of the polymer through a fluidized bed of polyethylene particles. A further method is to press the polyethylene into a film and pass hot air at a temperature ranging from 70° up to the melting point of the polymer over said polymer. In all the aforestated methods of oxidizing polyethylene, ozone can be used as a promoter and is usually added with the oxygen-containing gas stream. In addition, if desired, a minor amount, i.e. 0.05 to 5% by weight of an organic peroxide, nitrogen tetroxide or other oxidation promoter may be admixed with the polymer to increase the oxidation rate. Superatmospheric pressure may be used if desired in any of the oxidation methods employed including those aforestated.

The oxidation step can be terminated at any operable degree of oxidation, i.e. within the range 0.2 to 2.0 milliequivalents carboxyl/g. of polymer and, if desired, subsequently stabilized. For example, a suitable antioxidant such as 4,4''-thiobis (6,t-butyl-meta-cresol) sold under the trade name "Santonox" by Monsanto Chemical Company or N-phenyl-2-naphthylamine can be added to the oxidized polymer. However, stabilization of the oxidized polymer is required only to obtain accurate melt index measurements. In actual practice the oxidized polymer is not ordinarily stabilized in making emulsions.

The oxidized polyethylene of the instant invention wherein the carboxyl content is 0.2–2.0 milliequivalents/g. polyethylene is readily emulsified by the instant invention in a continuous aqueous phase in the presence of suitable conventional emulsifying agents. Both ionic and nonionic emulsifying agents are operable to emulsify the oxidized polymer. Ionic emulsifiers include, in the anionic class, amine salts of fatty acids. Morpholine, monoethanolamine, 2-amino-2-methyl-1-propanol and the like are suitable amines. Operable fatty acids include oleic, stearic, palmitic, myristic and the like higher fatty acids. Sodium, potassium and ammonium salts of the fatty acids are also operable. Salts of alkyl aryl sulfonic acids have also been used as emulsifying agents with good results. Operable ionic emulsifiers in the cationic class include but are not limited to acetate salts of long chain aliphatic amines. Polyoxyethylene esters of fatty acids, polyoxyethylene derivatives of sorbitans or of fatty acid substituted sorbitans, polyoxyethylene ethers of long chain alcohols, polyoxyethylene ethers of alkyl aryl phenols or combinations thereof are examples of a few nonionic emulsifiers operable in this invention. The amount of emulsifier employed is from 1 to 50 parts preferably 4 to 30 parts emulsifier/100 parts oxidized polyethylene by weight.

The amount of base added to the nonionic and anionic emulsion is an amount in the range from 40 to 200% of the theoretical amount required to neutralize the carboxylic acid groups on the polymer. When anionic emulsifiers such as amine salts of fatty acids are used, one generally adds an excess of the amine moiety to serve as the base.

In cationic emulsions, the emulsifier is usually an amine neutralized by an acid. In any event, all of the foregoing emulsifying agents, acids and bases are well known conventional compounds in emulsion formulations and form no part of the instant invention.

The aqueous emulsions resulting from the process of the instant invention contain 10–50% total solids by weight.

The oxidized high density polyethylene, emulsifier, base if used, and water are combined in any order in a pressure reactor equipped with an efficient stirrer. The air is evacuated and the reactor sealed. The mixture is heated with vigorous stirring to a temperature ranging from the melting point of the oxidized polyethylene up to 200° C. (preferably 140–160° C.) and maintained thereat for periods ranging from 5 minutes to 5 hours under the pressure of the system. The thus formed emulsion is cooled to room temperature with stirring. An example of emulsifying the oxidized high density polyethylene of the instant invention will be given hereinafter.

For treating the various fabrics in accord with the instant invention, the polyethylene emulsion can be added in several ways. For example, the polymer emulsion can be sprayed or brushed on the fabric. Another method is to immerse the fabric in the polyethylene emulsion. Excess liquid can then be removed by passage of the impregnated fabric through squeeze rolls, by heat, by evaporation at room temperature or any combination thereof or other well known means. To obtain the improved tear strength provided by the high density polyethylene to the fabric by means of the instant invention, it is preferred that the fabric be impregnated with 0.05–5.0%, preferably 0.1 to 2.0% nominal dry add-on of polyethylene. Lesser amounts do not afford sufficient improvement of tear strength whereas amounts in excess of the upper limit are unnecessary and in addition cause the material to stiffen. The following procedure sets forth one method of treating a fabric with an oxidized high density polyethylene emulsion to improve its luster and tear strength.

The polyethylene was oxidized to the required degree, i.e. 0.2–2.0 milliequivalents carboxyl/g. in the solid state in the presence of an oxygen-containing gas in a forced air oven at temperatures up to the crystalline melting point of the polymer. The oxidized polymer was then emulsified in a stirred pressure reactor with water, emulsifier and desired base at temperatures ranging from the melting point of the polymer up to about 200° C. to form emulsions containing 10 to 50% solids. Swatches of various fabrics were conditioned at 70° F. and 65% relative humidity and weighed. Each swatch was immersed in a fresh portion of diluted high density polyethylene emulsion or water and padded to a calculated wet pick-up. After immersion in the polyethylene emulsion, the fabric was passed through rubber nip rolls to remove excess emulsion. This process was repeated a second time, that is, the fabric was exposed to two dips in the emulsion and two nips through the squeeze rolls. The fabrics were mounted on laboratory tenter frames at their original dimensions and dried at 140° C. for 10 minutes unless otherwise specified. The fabrics were conditioned for 24 hours and reweighed. The expected "nominal" dry add-ons were calculated from the wet pick-ups and the concentration of the treating bath. In all examples five or more replicates were used for each treatment.

The treated fabrics were subjected to laundering in a Whirlpool home laundry machine using a mild setting (warm water wash, 120° F., warm water rinse, gentle agitation, and low speed spin). The detergent used was "Tide," manufactured by Procter and Gamble Co. The fabrics were tumbled dry in a Whirlpool home dryer except that after the 5th, 10th or 20th launderings the fabrics were mounted on tenter frames at their original dimensions and oven dried.

The fabrics were drycleaned in commercial RCA-Whirlpool self-service machines. These machines used perchlorethylene solvent. The cleaning cycle consisted of fluffing (5 minutes), solvent cleaning (10 minutes), extraction (10 minutes), and drying (20 minutes). Subsequently, after the fifth or tenth cycle, the fabrics were wetted out in Stoddard solvent, mounted on tenter frames at their original dimensions, oven dried, and conditioned.

The fabrics were tested for tear strength and luster after various launderings and drycleaning cycles as shown in the examples hereinafter.

Throughout the instant invention tests were conducted as follows:

The extent of oxidation of the polyethylene was determined by ascertaining the carboxyl content of the polymeric material by titration with base in the following manner. About 1 g. of the polymer to be analyzed was accurately weighed and dissolved in a 200 ml. Erlenmeyer flask on a magnetic stirrer-hot plate. About 15 drops of 0.1% phenolphthalein in absolute ethanol was added. While stirring was continued and the temperature maintained at 120–130° C., the solution was titrated to a colorless end point with standard 0.05 N potassium hydroxide in absolute ethanol.

Calculation:

$$\text{milliequivs. COOH per g.} = \frac{(\text{ml. of KOH})(\text{normality of KOH})}{(\text{g. of polymer})}$$

Melt indices (MI) were measured under the conditions specified in ASTM D1238–57T Under Condition E (melt index, i.e. MI), under Condition D and converted to MI by the formula log MI=0.921 log F+1.039 and under Condition F (high load melt index, i.e. HLMI).

Densities of the polymer in g./cc. were measured under the conditions specified in ASTM D1505–57T.

Reduced specific viscosity, i.e. RSV, was obtained by dissolving 0.1 g. of the polymer in 100 cc. decahydronaphthalene at 135° C. in accord with the procedure of ASTM D1601–61.

The crystalline melting point of the polymer was measured as the temperature at which birefrigence disappeared from the sample when viewed through crossed Nicol prisms in a hot stage microscope heated at a rate of 1° C./min.

The viscosity of the polyethylene emulsions was measured at 23° C. with a Brookfield Viscometer Model LVT using Spindle No. 1 at 60 r.p.m.

Total combined oxygen content of the oxidized polyethylene was determined by the method of J. Unterzaucher, Ber. 73, 391 (1940).

Hydroxyl content of the oxidized polyethylene was determined by quantitative acetylation with $C^{14}$ labeled acetic anhydride. The thus labeled polymer was precipitated with acetone, washed to remove excess acetic anhydride, dried and pressed into a plaque of 10–20 mil thickness. Radiochemical analysis of the pressed plaque gives a determination of hydroxyl groups.

Ester content of the oxidized polyethylene was determined by infrared spectrometric measurements of the 1178 cm.$^{-1}$ ester C-O stretching vibration band of the oxidized polyethylene. This measurement was compared to those made from mixtures of known amounts of long-chain esters of polyethylene and the ester content of the oxidized polyethylene was calculated from this comparison.

Tear strength was measured on conditioned fabrics in the warp direction using the Elmendorf tester according to the ASTM D1424–59 test method.

In the case of Dacron the length of tear was reduced from 43 to 21.5 mm. and the results multiplied by 2.

The luster of the treated fabrics was measured with a

Hunter goniophotometer. In this test the light falls on the sample at an angle of −45° and the light reflected by the sample at angles of 0° and 45° to the normal is measured. The ratio of these results, called the contrast ratio, is used as the basis of evaluating the luster.

Unless otherwise noted, all parts and percentages are by weight.

The following example shows a method of oxidizing the high density polyethylene of the instant invention.

EXAMPLE 1

200 lbs. of commercially available polyethylene having a density of 0.955, a crystalline melting point of 135° C., a reduced specific viscosity of 4.5 and a melt index of 0.0 was oxidized in air in a ribbon blender at 114–118° C. for 57 hours. The thus oxidized polyethylene had a density of 0.99, a melt index of 540, a carboxyl content of 0.50 milliequivalent/g. and contained 2.21 weight percent carbonyl.

The following example shows the emulsification of the oxidized polyethylene of Example 1.

EXAMPLE 2

To a 2-quart "Chemco" stirred reactor equipped with a high speed air stirrer was charged 450 parts distilled water, 100 parts of oxidized polyethylene from Example 1, 7.9 parts of a 32% KOH solution and 31 parts of a nonionic emulsifier, i.e. a polyoxyethylene nonyl phenol ether sold under the trade name "Renex 697" by Atlas Chemical Industries, Inc. Air was evacuated from the reactor and the reactor was sealed. Vigorous stirring was commenced and the reactor was heated to 150° C. The mixture was maintained at 150–155° C. and 55 p.s.i.g. for 30 mins. with vigorous stirring. Stirring was continued while the thus formed emulsion was cooled to room temperature. The resulting stable emulsion (23.7% solids) had a viscosity of 6.0 centipoises at 23° C. when measured with a Brookfield Viscometer Model LVT using Spindle No. 1 at 60 r.p.m. The starting oxidized polyethylene was shown to be 99+% emulsified by filtering the emulsion through a 100 mesh screen at 25° C. This emulsion will be known hereinafter as Emulsion A.

EXAMPLE 3

150 lbs. of commercialy available polyethylene having a reduced specific viscosity of 4.5, a density of 0.95 g./cc. and a melting point of 135° C. were charged to a ribbon blender and oxidized therein at 118–122° C. in a gas mixture consisting of 90% oxygen and 10% nitrogen by volume for 29½ hours. On characterization the oxidized product had a melt index of 3,300, a reduced specific viscosity of 0.29, a density of 1.0, a carbonyl content of 1.8 weight percent and a carboxyl content of 0.47 milliequivalent/g. oxidized polyethylene.

100 parts of thus oxidized polyethylene were emulsified using the procedure and reactants set out in Example 2. The cited oxidized polyethylene was shown to be 99+% emulsified by filtering the emulsion through a 100 mesh screen at 25° C. This emulsion will be referred to as Emulsion B.

The following low density polyethylene was made up for comparative purposes.

EXAMPLE 4

To a 2-quart "Chemco" stirred reactor equipped with a high speed air stirrer was charged 450 parts distilled water, 100 parts of a commercially available emulsifiable polyethylene having a density of 0.938 g./cc., a melting point of 96° C., a reduced specific viscosity of 0.13, a melt index of 65,000 and a carboxyl content of 0.30 milliequivalent/g. along with 5.7 parts of a 32% KOH solution and 31 parts of a nonionic emulsifier, i.e., a polyoxyethylene nonyl phenol ether sold under the trade name "Renex 697" by Atlas Chemical Industries, Inc. Air was evacuated from the reactor and the reactor was sealed. Vigorous stirring was commenced and the reactor was heated to 150° C. The mixture was maintained at 150–155° C. and 55 p.s.i.g. for 30 minutes with vigorous stirring. Stirring was continued while the thus formed emulsion was cooled to room temperature. The emulsifiable polyethylene was shown to be 99+% emulsified by filtering the emulsion through a 100 mesh screen at 25° C. This low density emulsion will be referred to hereinafter as Emulsion C. The use of the above emulsions to improve the tear strength and luster of various fabrics will be shown in the following examples.

EXAMPLE 5

Swatches of 80 x 80 cotton print cloth weighing 2.9 ozs. per sq. yard were padded with Emulsion A diluted to contain 25 g. of oxidized high density polyethylene per kilogram of emulsion. The swatches were given two dips in the diluted emulsion and two nips in pad rolls to a wet pickup of 90%. The thus treated swatches were tentered to their original dimensions, and then oven dried at 140° C. for 10 mins. The dried and conditioned fabrics had 0.1% solids based on the wet pick-up and the concentration of solids in the bath.

In a similar manner swatches of the same material were treated with (a) Emulsion B, (b) Emulsion C and (c) water.

The tear strengths measured with a Elmendorf tester are shown in Table II.

TABLE II

| Treatment: | Density of Polymer (g./cc.) | Tear Strength |
|---|---|---|
| 0.1% Emulsion A | 0.99 | 1,040 |
| 0.1% Emulsion B | 1.0 | 1,030 |
| 0.1% Emulsion C | 0.938 | 830 |
| Water | | 740 |

As can be seen from the above results from Table II the high density material afforded far greater tear strength than the low density polyethylene.

EXAMPLE 6

Swatches of cotton fabrics as used in Example 5 were treated with the same emulsions as in Example 5 except that the concentration was increased to a nominal add-on of 0.5% solids. After treatment, as in Example 5, these fabrics were laundered 20 times in a home washing machine using a detergent composition similar to "Tide." Other samples of the swatches were also drycleaned in a commercial unit. The tear strengths of the thus treated fabrics are shown in Table III below.

TABLE III

| | Tear Strength, g. | | | |
|---|---|---|---|---|
| Treatment | Treated | Laundered, 10 cycles | Laundered, 20 cycles | Drycleaned 10 cycles |
| 0.5% Emulsion A | 1,260 | 1,100 | 1,090 | 1,290 |
| 0.5% Emulsion B | 1,310 | 1,220 | 1,090 | 1,280 |
| 0.5% Emulsion C | 1,280 | 820 | 780 | 1,120 |
| Water | 831 | 630 | 680 | 1,060 |

As can readily be seen from the results in Table III improvement in tear strength afforded by the high density polyethylene is more durable than that afforded by presently used low density polyethylene.

The following example shows the operability of the instant invention when the fabric has been resin treated.

EXAMPLE 7

Cotton print swatches were treated as in Example 5 except that the emulsions contained 6% dimethylethylene urea (DMEU), sold under the trade name "Rhonite R–1" by Rohm and Haas, a zinc nitrate catalyst and 0.1% Triton X–100, a wetting agent. After the swatches were dried, they were cured for 3 minutes at 160° C. The swatches were rinsed to remove unreacted resin, tentered, and dried. Swatches were treated in this manner with the above reactants or with Emulsion A, Emulsion C, and water in combination with the above reactants.

The swatches were laundered and the tear strength determined with an Elmendorf tester in accord with the procedure set out in Example 6. The results are shown below in Table IV.

TABLE IV

| Treatment | Tear strength, g. | | |
|---|---|---|---|
| | Treated | After 10 Launderings | After 20 Launderings |
| 6% DMEU plus 0.1% Emulsion A | 910 | 910 | 830 |
| 6% DMEU plus 0.1% Emulsion C | 790 | 770 | 680 |
| 6% DMEU | 580 | 560 | 570 |

The results in Table IV show that improved tear strength is afforded by the high density polyethylene even after repeated launderings as compared to low density polyethylene for resin treated fabrics.

The following examples show the operability of the instant invention with various fabrics.

EXAMPLE 8

Swatches of spun Acrilan 16, 63 x 50 yarns per inch, 3.4 ounces per square yard; spun Dacron, 66 x 62, 4.1 ounces per square yard and nylon taffeta, type 200, 144 x 72 yarns per square inch, 2.0 ounces per square yard; were treated with Emulsion A in accord with the method described in Example 5. The tear strength determined with an Elmendorf tester are shown below in Table V.

TABLE V

| Treatment | | Tear Strength, g. |
|---|---|---|
| Fabric: | | |
| Acrilan | 0.5% Emulsion A | 5,280 |
| Do | 0.1% Emulsion A | 5,160 |
| Do | Water | 3,870 |
| Dacron | 0.5% Emulsion A | 10,500 |
| Do | 0.1% Emulsion A | 7,120 |
| Do | Water | 5,590 |
| Nylon | 0.5% Emulsion A | 3,970 |
| Do | 0.1% Emulsion A | 3,870 |
| Do | Water | 3,350 |

The results in Table V show that the treatment afforded by the instant invention improves the tear strength of various synthetic fabrics.

The following examples show the improvement in luster afforded to various fabrics by the practice of the present invention.

EXAMPLE 9

Swatches of cotton printcloth, 80 x 80 yarns per inch and weighing 2.9 oz. per square yard were padded with Emulsion A diluted to contain 25 g. of oxidized high density polyethylene per kilogram of emulsion. The swatches were given two dips in this diluted emulsion and two nips of the pad rolls to a wet pick-up of 90%. The treated fabrics were tentered to their original dimensions, and oven dried at 140° C. for 10 minutes. The dried and conditioned fabrics had 0.5% solids add-on based on the wet pick-up and the concentration of the bath. Similar swatches were treated with Emulsion B, Emulsion C and water for comparison.

The luster of the fabrics before and after treatment was measured with a Hunter goniophotometer using the contrast ratio method. In this method, light from a standard source falls on the sample at an angle of −45° and the light reflected by the fabric at angles of 0° and 45° to the normal are measured. The ratio of these results, called the contrast ratio, indicates whether the treated fabric is more lustrous or not. That is, a higher contrast ratio for the treated fabric of the order of 0.02 or more over the untreated fabric is considered to represent a significant improvement in luster.

The fabrics were laundered 10 times in a home washing machine with a detergent composition similar to "Tide" (manufactured by Procter & Gamble), and also 5 times in a commercial coin-operated dry-cleaning unit. The luster values are shown in Table VI below:

TABLE VI

| Fabric | Luster, contrast ratio | | | |
|---|---|---|---|---|
| | After Treatment | After 5 Launderings | After 10 Launderings | After 5 Dry-cleanings |
| Cotton treated with 0.5% Emulsion A | 1.60 | 1.49 | 1.52 | 1.59 |
| Cotton treated with 0.5% Emulsion B | 1.61 | 1.52 | 1.48 | 1.60 |
| Cotton treated with 0.5% Emulsion C | 1.58 | 1.50 | 1.48 | 1.55 |
| Cotton treated with water | 1.56 | 1.49 | 1.49 | 1.57 |

EXAMPLE 10

Spun viscose rayon challis, 72 x 57 yarns per inch, 4.1 ounces per square yard, was treated with 0.5% Emulsion B by the method described in Example 9. The luster of the rayon calculated as contrast ratio increased from 1.48 to 1.53.

EXAMPLE 11

Nylon taffeta (type 200), 144 x 72 yarns per inch, 2.9 ounces per square yard, was treated with 0.5% Emulsion A according to the method described in Example 9. The contrast ratio increased from 1.29 to 1.31 as a result of this treatment.

What is claimed is:

1. A process for improving the tear strength of fabrics produced from the group consisting of cotton fiber, polyester fiber made of a diol and a member selected from the group consisting of terephthalic acid and a mixture of dibasic acids of which terephthalic acid comprises at least about 90%, synthetic fiber containing at least 85% acrylonitrile, and rayon fiber, which comprises applying to said fabric an emulsion of an emulsifiable polyethylene having a density in the range 0.945–1.05 g./cc. and a carboxyl content of 0.2–2.0 milliequivalents/g., and drying the treated fabric to thereby produce on said fiber a coating of said emulsifiable polyethylene of 0.05 to 5% by weight of the treated fabric.

2. The method of claim 1 wherein the fabric is produced from cotton fiber.

3. A process for improving the tear strength of fabrics produced from the group consisting of cotton fiber, polyester fiber made of a diol and a member selected from the group consisting of terephthalic acid and a mixture of dibasic acids of which terephthalic acid comprises at least about 90%, synthetic fiber containing at least 85% acrylonitrile, and rayon fiber, which comprises applying to said fabric an emulsion of an emulsifiable polyethylene having a density in the range 0.945–1.05 g./cc. and a carboxyl content of 0.2–2.0 milliequivalents/g., to thereby produce on said fiber a coating of said emulsifiable polyethylene of 0.05 to 5% by weight of the treated fabric and thereafter heating said fabric to consolidate the coating thereon.

4. The method of claim 3 wherein the fabric is produced from cotton fiber.

References Cited

UNITED STATES PATENTS

| | | | |
|---|---|---|---|
| 2,943,380 | 7/1960 | Suckle | 28—80 |
| 3,155,644 | 11/1964 | Kehr | 260—94.9 |
| 3,232,917 | 2/1966 | McCall et al. | 260—94.9 X |
| 3,245,831 | 4/1966 | Shippe | 117—139.5 |
| 3,322,711 | 5/1967 | Bush et al. | 260—94.9 |
| 3,329,667 | 7/1967 | Braude et al. | 260—94.9 |
| 3,215,556 | 11/1965 | Kehr | 117—143 |

OTHER REFERENCES

Rosenbaum: Use of Polyethylene Emulsions in Textile Applications, pp. 46–50, American Dyestuff Reporter, May 18, 1959.

WILLIAM D. MARTIN, Primary Examiner

T. G. DAVIS, Assistant Examiner

U.S. Cl. X.R.

117—138.8, 139.5, 143, 145, 161